(12) United States Patent
DeYoung (10) Patent No.: US 10,720,812 B2
(45) Date of Patent: Jul. 21, 2020

(54) ELECTRIC MOTOR MODULE WITH INTEGRATED CAM SWITCHES INCORPORATING A SINGLE WIRING CONNECTION POINT

(71) Applicant: HTI Technology & Industries, Inc., LaVergne, TN (US)

(72) Inventor: Roger DeYoung, Franklin, TN (US)

(73) Assignee: HTI Technology and Industries, Inc., La Vergne, TN (US)

( * ) Notice: Subject to any disclaimer, the term of this patent is extended or adjusted under 35 U.S.C. 154(b) by 239 days.

(21) Appl. No.: 16/015,477

(22) Filed: Jun. 22, 2018

(65) Prior Publication Data

US 2019/0013714 A1    Jan. 10, 2019

Related U.S. Application Data

(60) Provisional application No. 62/528,780, filed on Jul. 5, 2017.

(51) Int. Cl.
*H02K 5/22*         (2006.01)
*H02K 15/14*        (2006.01)
(Continued)

(52) U.S. Cl.
CPC .............. *H02K 5/225* (2013.01); *F16H 25/16* (2013.01); *F16K 31/04* (2013.01); *F24C 15/022* (2013.01); *F24F 13/10* (2013.01); *H01H 1/5866* (2013.01); *H01H 3/26* (2013.01); *H01R 27/02* (2013.01); *H02K 7/14* (2013.01); *H02K 11/20* (2016.01);
(Continued)

(58) Field of Classification Search
CPC ........ H02K 5/225; H02K 15/00; H02K 15/14; H02K 5/22; H02K 7/06; F16H 25/16; F16K 31/40; F24C 15/022; F24F 13/10; H01H 1/5866; H01H 3/26; H01H 3/42; H01H 2003/268; H01R 27/02; H01R 2103/00; H01R 2201/10
See application file for complete search history.

(56) References Cited

U.S. PATENT DOCUMENTS

| 4,458,122 A * | 7/1984 | Knight | ................ | H01H 3/0226 |
| | | | | 200/332.1 |
| 7,649,148 B2 * | 1/2010 | Pearson | ............... | H01H 43/022 |
| | | | | 200/38 A |

(Continued)

*Primary Examiner* — Emily P Pham
(74) *Attorney, Agent, or Firm* — Emerson, Thomson & Bennett, LLC; Roger D. Emerson (57) ABSTRACT

Provided is an electric motor assembly and method for assembling an electric motor assembly within an appliance. The electric motor assembly eliminates the use of a rigid or flexible circuit board. It also eliminates the need for soldering contacts between the electrical switches, circuit board and motor which can increase the possibility of operational failures. The electric motor assembly further provides a single power point wiring connection between the switch and motor terminals and connector port allowing the motorized device to communicate with an appliance controller. Furthermore, by positioning certain mechanical components for operating electrical switches on the baseplate of the electric motor assembly and eliminating secondary components on adjacent brackets, a reduction in the dimensional tolerance stack-up among the electrical switches can be obtained.

20 Claims, 11 Drawing Sheets

(51) Int. Cl.
*H01H 1/58* (2006.01)
*H01H 3/26* (2006.01)
*H01R 27/02* (2006.01)
*F24C 15/02* (2006.01)
*F16K 31/04* (2006.01)
*F24F 13/10* (2006.01)
*F16H 25/16* (2006.01)
*H02K 15/00* (2006.01)
*H02K 11/20* (2016.01)
*H02K 7/14* (2006.01)
*H02K 7/06* (2006.01)
*H01R 103/00* (2006.01)
*H01H 3/42* (2006.01)

(52) U.S. Cl.
CPC .............. *H02K 15/00* (2013.01); *H02K 15/14* (2013.01); *H01H 3/42* (2013.01); *H01H 2003/268* (2013.01); *H01R 2103/00* (2013.01); *H01R 2201/10* (2013.01); *H02K 7/06* (2013.01)

(56) References Cited

U.S. PATENT DOCUMENTS 9,054,440 B2 * 6/2015 Taylor .................... H04Q 1/136
2012/0241470 A1 * 9/2012 Snodgrass ............. A61L 2/0088
222/63

* cited by examiner

ELECTRIC MOTOR MODULE WITH INTEGRATED CAM SWITCHES INCORPORATING A SINGLE WIRING CONNECTION POINT

CROSS-REFERENCE TO RELATED APPLICATIONS

This application claims the benefit of U.S. Provisional Application No. 62/528,780, filed Jul. 5, 2017, the entirety of which is fully incorporated by reference herein.

TECHNICAL FIELD

Provided is an electromechanical apparatus for an appliance which eliminates the need for electronic circuit boards, reduces dimensional tolerance stack-up, provides a single point power connection and which does not require a secondary linear cam or plunger to activate a switch.

BACKGROUND

Powered appliances, such as cooking ovens, furnaces, and water heaters, washing machines, etc., incorporate motorized mechanisms such as motorized door latches, motorized gas valves, and other motorized devices that communicate and collaborate with the appliance's electronic controls. These motorized devices typically have sensing switches that sense a rotational or linear position of the motorized mechanism. These switches, when actuated, simply communicate open or closed circuits to the appliance controller. These switches are typically arranged radially around a radial cam that is driven by the motor shaft. Other devices incorporate a secondary linear cam or plunger that may be actuated by an appliance door or similar actuation method. This secondary cam or plunger actuates an independent switch that also communicates with the appliance controller. Typically, the controller will not proceed with appliance functions until the secondary switch is actuated by the closing of an appliance door or similar function. Upon actuation of the switch, these motorized mechanisms signal the controller, by opening or closing a circuit, to proceed with the appliance function. As the motor runs, a radial cam on the motor shaft actuates one or more switches in correspondence with the cam's rotational position. Each switch performs a specific sensing function for position of the mechanism. The controller reads the open or closed status of each circuit and operates the mechanism, and other appliance functions, as its programming logic directs.

Due to the radial arrangements of the switches on such mechanisms, wiring connection points are typically physically segregated. Most of these systems have two to five segregated wiring connections points for switches in addition to separate wiring connection points for the motor and the linear cam or plunger actuated switch. Multiple and segregated wiring connection points can be problematic for manufacturers and in-field service technicians. Two known problems include, but are not limited to, considerable assembly time and improper connections. The consequence of improper connections can result in product failure and/or unsafe product operation, all of which are costly for the manufacturer.

One additional problem of these motorized mechanisms is the stack-up of dimensional tolerances in the radial and angular positional relationship of the cam and the switches. This is due to the switches being mounted to adjacent brackets; each of which has independent dimensional tolerances. As these tolerances combine with each other, the accuracy of the sensing function of each switch decreases. Consequently, manufacturers are challenged with producing multiple parts with very small tolerances. This too, is costly for the manufacturer.

In recent years, motorized mechanisms have been developed that incorporate rigid or flexible circuit boards that are directly soldered to the switches and motor. Through a series of circuit paths in the circuit board, these mechanisms provide a single point wiring connection for the motorized device to communicate with the appliance controller. The benefit of such a system is the circuit board fundamentally precludes any possibility of improper connection and the single point wiring connection provides for speedy assembly time. However, circuit boards add cost to the motorized mechanism and add a number of solder connections in direct proportion to the number of switches. Inherently, as solder connections increase, failure mode possibilities also increase. What is needed for motorized mechanisms is a single point wiring connection for switches and motor without the complexity, cost, and solder connections of rigid or flexible circuit boards and without the stack up of tolerances in the radial and angular positional relationship of the cam and switches.

SUMMARY

Provided is an electric motor assembly. The electric motor assembly includes the following components: 1) a motor module housed within a motor housing shell having a front cover, a cylindrical side wall and an open back side; 2) a motor housing baseplate attached to the open back side of the motor housing shell; 3) a motor shaft which extends through the motor housing baseplate and which engages a cam; 4) at least one microswitch module which is positioned adjacent to the cam, wherein the cam engages the microswitch at a contact point upon rotation of the cam by the motor; 5) microswitch terminals which extend from the microswitch module; 6) motor terminals which extend from the motor module through the motor housing shell, wherein the microswitch terminals are positioned adjacent to the motor terminals to provide a single power point connection for connecting sockets of a wiring harness.

In certain aspects of the present disclosure, the motor shaft engages a radial cam.

In certain aspects of the present disclosure, the radial cam engages at least one cam follower switch actuator.

In certain aspects of the present disclosure, the cam follower switch actuator includes a first projection, wherein the first projection establishes a first contact point between the cam follower switch actuator and the radial cam.

In certain aspects of the present disclosure, the cam follower switch actuator includes a second projection, wherein the second projection establishes a second contact point between the cam follower switch actuator and the microswitch.

In certain aspects of the present disclosure, the cam follower switch actuator includes a first aperture at a first end and a slot at a second end, wherein the first aperture receives a pivot pin and the slot receives a guide pin, wherein the pivot pin and the guide pin allow the cam follower switch actuator to rotate upon contact of the first projection with the radial cam causing the second projection to contact the microswitch.

In certain aspects of the present disclosure, the base plate includes at least one extension including an aperture therein for receiving a fastener.

In certain aspects of the present disclosure, a plunger microswitch and plunger microswitch terminals are positioned adjacent to the microswitch and motor terminals.

In certain aspects of the present disclosure, the plunger terminals, microswitch terminals and motor terminals form a single power point connection with sockets of a wiring harness.

In certain aspects of the present disclosure, the electric motor assembly does not include a rigid or flexible circuit board to electrically connect the switches to the motor module.

In certain aspects of the present disclosure, the electric motor assembly does not include a secondary cam or plunger on a bracket separate from the motor housing baseplate.

In certain aspects of the present disclosure, radial and angular positioning of the microswitch with respect to the cam on the baseplate reduces tolerance stack up of the cam and microswitch compared to electric motor assemblies having a secondary cam or plunger on a bracket separate from the motor housing baseplate.

In certain aspects of the present disclosure, the electric motor assembly is connected to a mechanical assembly for an appliance.

In certain aspects of the present disclosure, the electric motor assembly is connected to a motorized oven latch.

In certain aspects of the present disclosure, the electric motor assembly is connected to a motorized gas valve.

In certain aspects of the present disclosure, the electric motor assembly is connected to a motorized flue damper.

Also provided is a method for installing an electric motor assembly within an appliance. The method includes the following steps: 1) providing an appliance; 2) providing an electric motor assembly which includes: a motor module housed within a motor housing shell having a front cover, a cylindrical side wall and an open back side; a motor housing baseplate attached to the open back side of the motor housing shell; a motor shaft which extends through the motor housing baseplate and which engages a cam; at least one microswitch module which is positioned adjacent to the cam, wherein the cam engages the microswitch at a contact point upon rotation of the cam by the motor; microswitch terminals which extend from the microswitch module; and motor terminals which extend from the motor module through the motor housing shell, wherein the microswitch terminals are positioned adjacent to the motor terminals to provide a single power point connection for connecting sockets of a wiring harness; 3) providing a mechanical device in operable association with the electric motor assembly, wherein the mechanical device and the electric motor assembly are housed on a chassis; 4) inserting the chassis containing component parts of the mechanical device and the electrical motor assembly within the appliance; 5) connecting the mechanical device to the appliance by connecting the chassis to the appliance and the component parts of the mechanical device to the appliance; and 6) electrically connecting the electric motor assembly to the appliance by connecting sockets of an appliance wiring harness to switch terminals and motor terminals within a microswitch-electric motor connector port through a single point power connection.

In certain aspects of the present disclosure, the mechanical device utilized within the method is an oven latch, a gas valve, or a flue damper.

BRIEF DESCRIPTION OF THE DRAWINGS

The accompanying drawings in the following description illustrate various exemplary embodiments of the present disclosure. It is understood that a person of ordinary skill in the art may derive other embodiments from these drawings which fall within the scope of the disclosure set forth herein.

FIGS. 5b through 5d are each a top sectional view illustrating the connection between the latching mechanism and the electric motor assembly of FIG. 5a.

DETAILED DESCRIPTION

The present disclosure provides a means to integrate cam actuated switches and a single point of wiring connection into an electric motor module. This module can be incorporated into motorized appliance latches, motorized gas valves, motorized flue dampers, motorized refrigeration baffles, and other motorized mechanisms.

The electric motor assemblies disclosed herein incorporate a synchronous gear motor, which is an AC motor that runs at a very specific speed in relationship to the frequency of the alternating current, and has multiple gears that provide a speed reduction from the motor's armature shaft to a separate output shaft that protrudes through the baseplate. This output shaft provides a means by which a motorized mechanism is driven. The outer housing of this synchronous gear motor is constructed of one hollow metal shell and one metal baseplate. It is upon the outer side of this baseplate that component parts are affixed adjacent to cam actuated switches in precise proximity to the motor terminals, thus allowing for a single wiring connection of motor and switches without the need of additional circuitry such as a rigid or flexible circuit board. Further, the baseplate provides for accurate radial and angular positioning of the switches with respect to the cam, thus reducing the tolerance stack-up associated with other similar mechanisms that affix switches to adjacent brackets.

Figure 1:
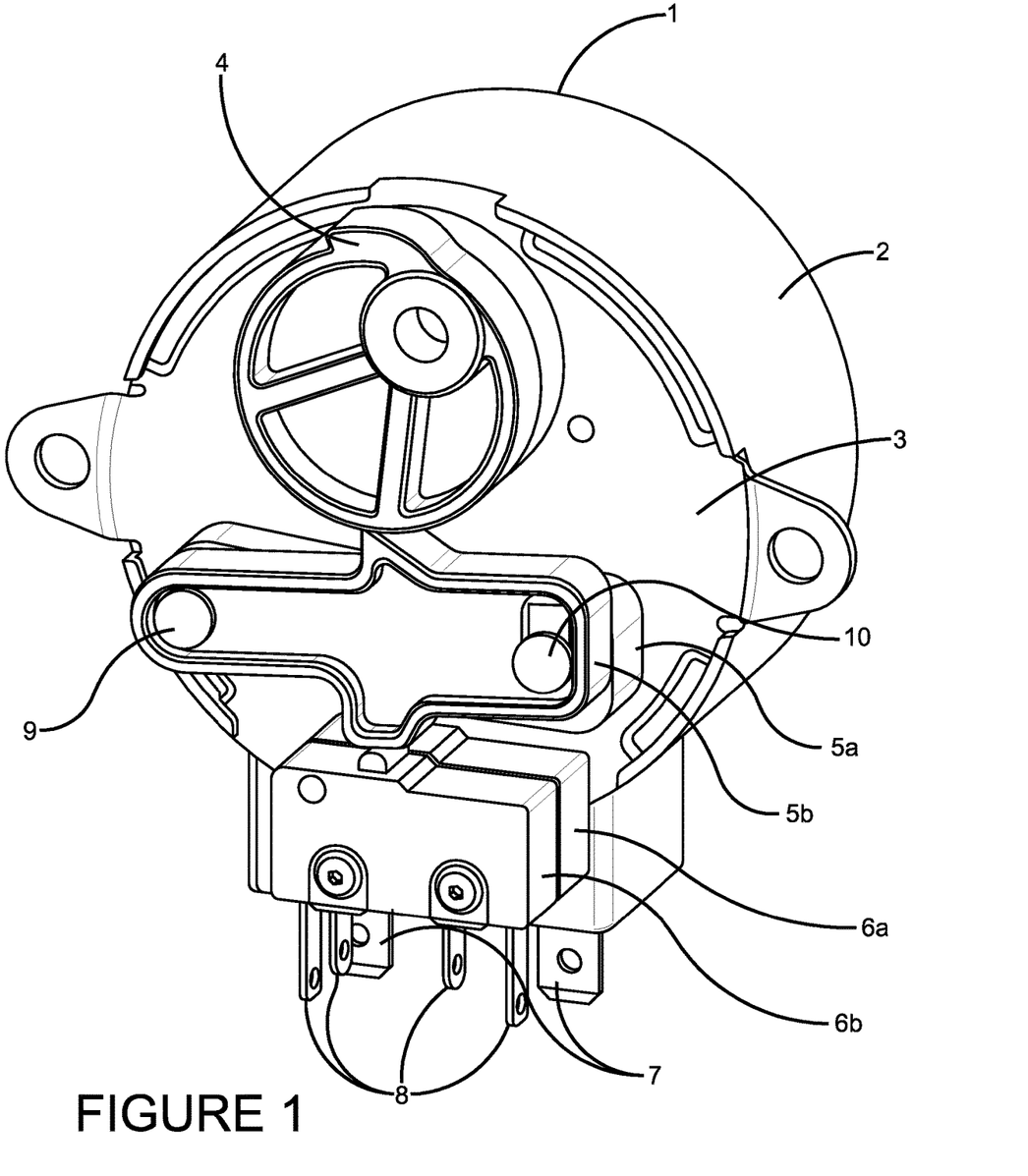
FIG. 1 is a back perspective view of one embodiment of an electric motor assembly disclosed herein.
Figure 2:
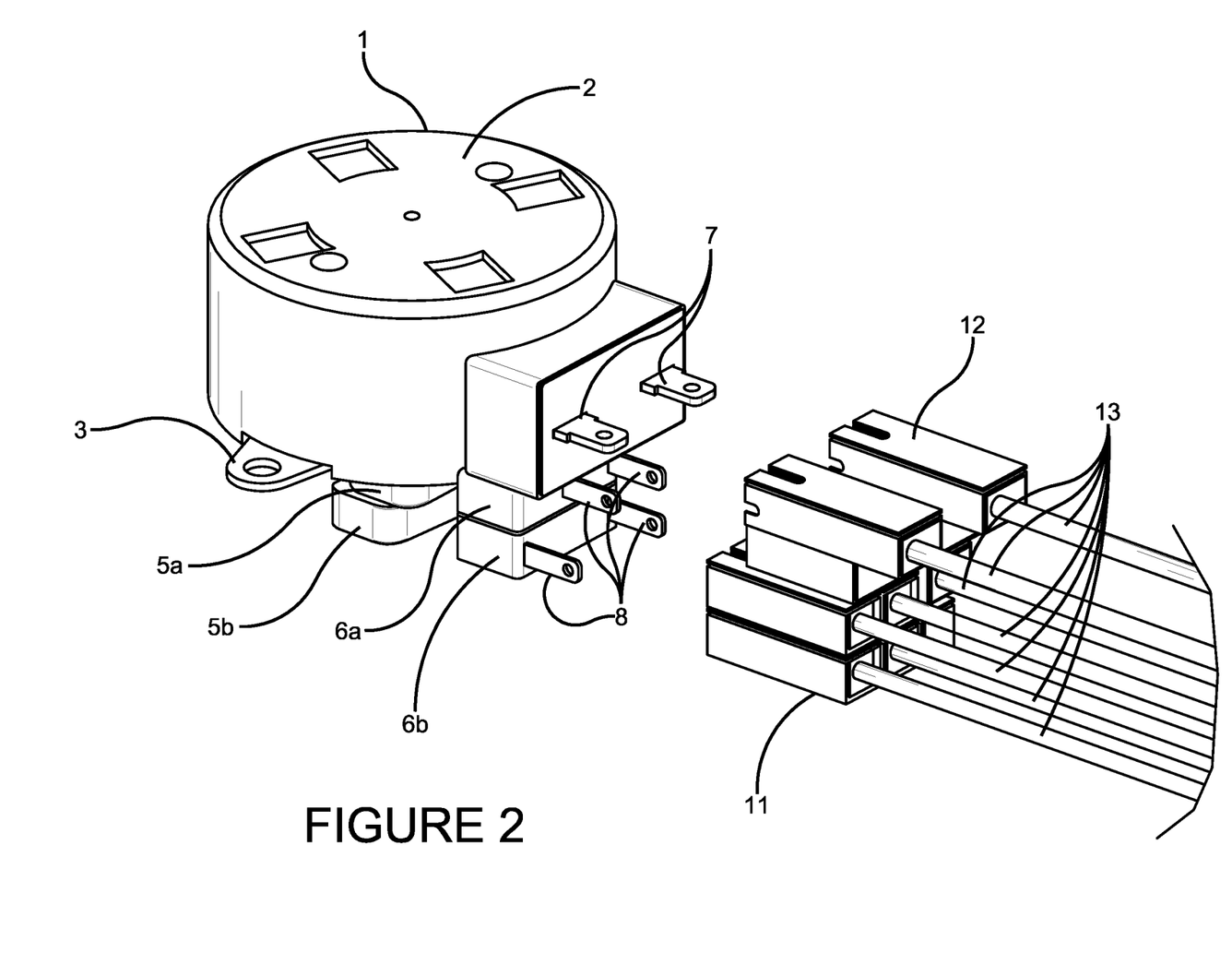
FIG. 2 is a perspective side view of the electric motor assembly shown in FIG. 1 shown in conjunction with an appliance wiring harness.

Various embodiments of electric motor assemblies are provided in FIGS. 1 through 7. FIGS. 1 and 2 illustrate an exemplary electric motor assembly having a cam activated switch and a single wiring connection without a rigid or flexible circuit board. The electric motor assembly of FIGS. 1 and 2 include a synchronous motor module (1) housed within a motor housing shell (2). In certain embodiments, the housing shell (2) is cylindrically shaped although the housing shell may consist of any size or shape that is configured to house the synchronous motor module (1). The cylindrical motor housing shell (1) includes a front cover and a side wall and an open back side into which the motor module (1) may be inserted. A motor housing baseplate (3)

is attached to the open back side of the motor housing shell to close the open back side of the housing shell (2). The motor housing baseplate (3) includes two mounting extensions having an aperture for mounting the electric motor assembly onto an appliance with any type of suitable fastener such as a screw or bolt. The synchronous motor module (1) includes an armature shaft (not shown) and an output shaft that protrudes through the baseplate (3) and rotates a radial cam (4). The radial cam includes an outer circumferential surface which contains at least one projection. The baseplate (3) also houses two cam follower/switch actuators (5a) and (5b) adjacent to the radial cam (4). The cam follower/switch actuators (5a) and (5b) include a first aperture for receiving a follower pivot pin (9) and a second aperture or slot for receiving a follower guide pin (10). The combination of the pivot pin (9) and the follower guide pin (10) on the cam follower switch actuators (5a) and (5b) allow the cam follower switch actuators to rotate in a radial direction. The first and second cam follower switch actuators (5a) and (5b) also include at least two projections which form a first contact point and a second contact point. The first contact point on the cam follower switch actuator is adjacent to the radial cam (4). Upon activation of the synchronous motor module (1), the radial cam (4) rotates allowing the projection on the radial cam (4) to contact the first contact point on the cam follower switch actuator (5a) and/or (5b) causing the cam follower switch actuator (5a) and/or (5b) to rotate. The second projection on the cam follower switch actuator (5a) and (5b) forms a second contact point that is designed to contact a switch on a microswitch module (6a) and/or (6b) upon rotation of the cam follower switch actuator (5a) and/or (5b). The contact between the cam follower switch actuator (5a) and/or (5b) and the microswitch module (6a) and/or (6b) is established by positioning the microswitch module (6a) and/or (6b) on the motor housing baseplate (3) adjacent to the cam follower switch actuator (5a) and/or (5b). Moreover, as illustrated within FIGS. 1 and 2, the microswitch modules (6a) and (6b) are positioned adjacent to the motor module electrical connection point. This allows a for a single power point connector (12) to be used to provide an electrical connection to the motor terminals (7) and the switch terminals (8) on the microswitch modules (6a) and (6b). This single point power connection is illustrated within FIG. 2 which shows an appliance wiring harness (11) having wires (13) and connection sockets for engaging motor terminals (7) and switch terminals (8). In addition to the allowing for a single point power connection (12), the positioning of the microswitch modules (6a) and (6b) adjacent to the motor terminals (7) obviates the need for rigid or flexible circuit board and reduces dimensional tolerance stack up.

Figure 3:
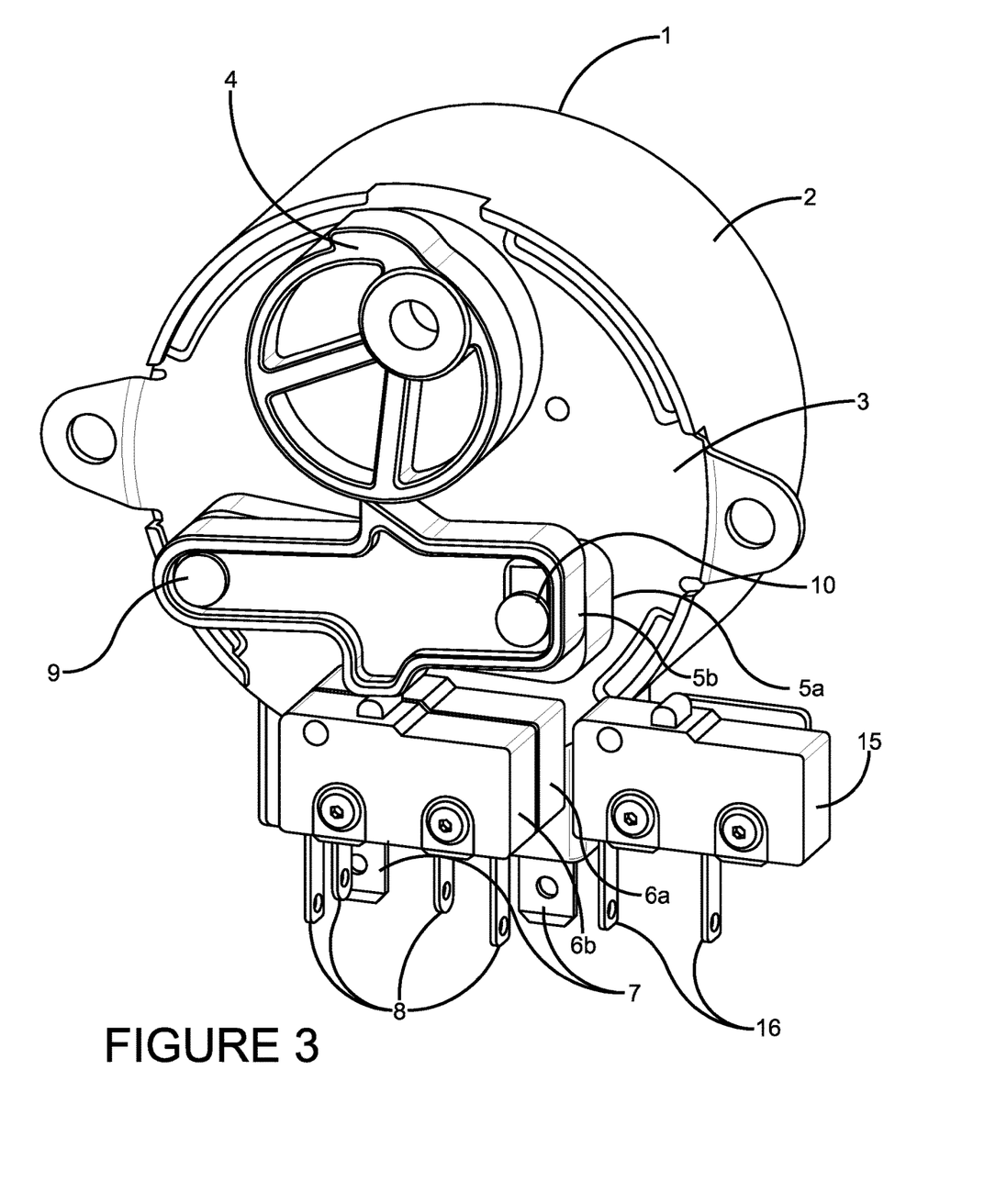
FIG. 3 is a back perspective view of a further embodiment of an electric motor assembly disclosed herein.
Figure 4:
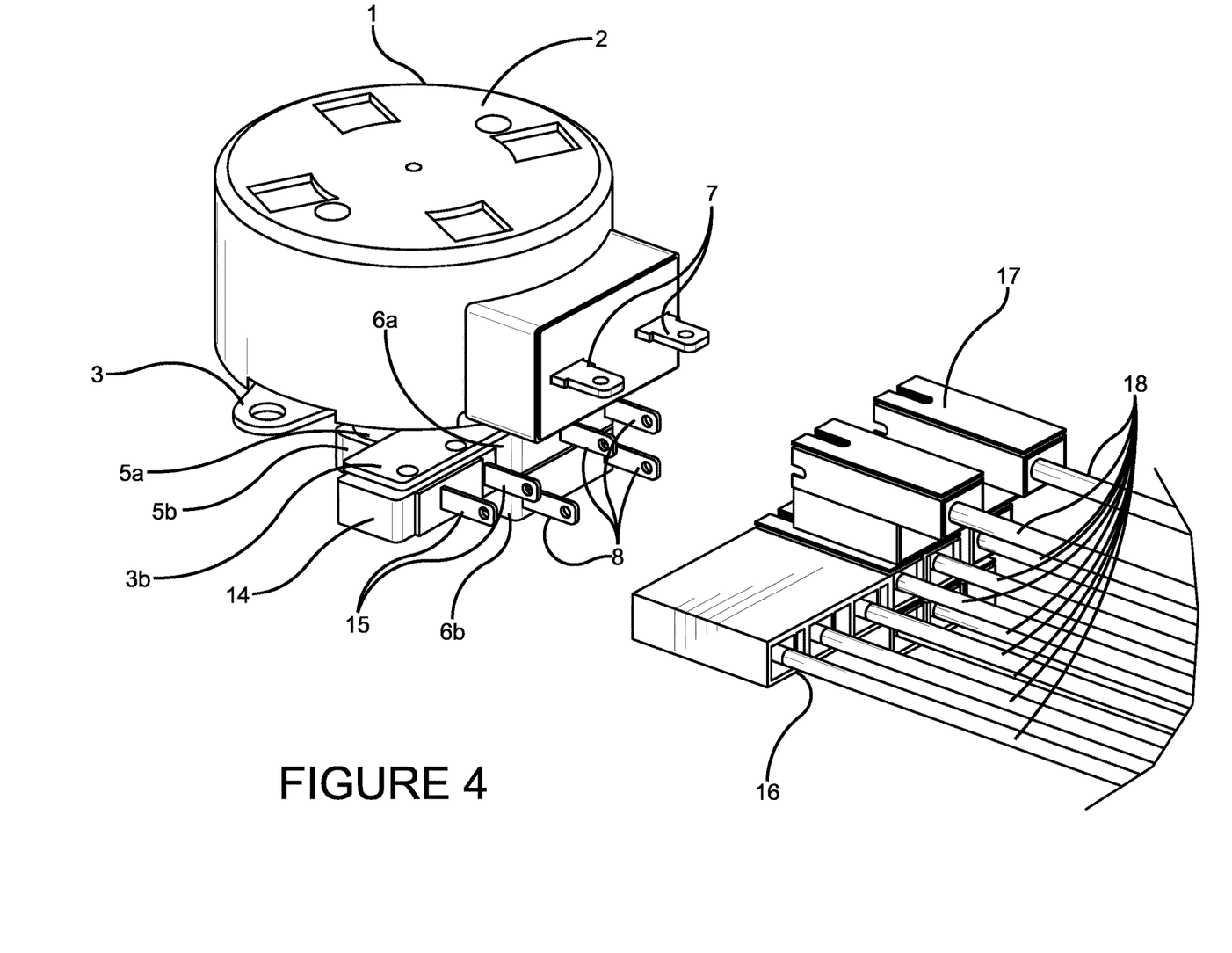
FIG. 4 is a perspective side view of the electric motor assembly shown in FIG. 3 shown in conjunction with an appliance wiring harness.
Figure 5A:
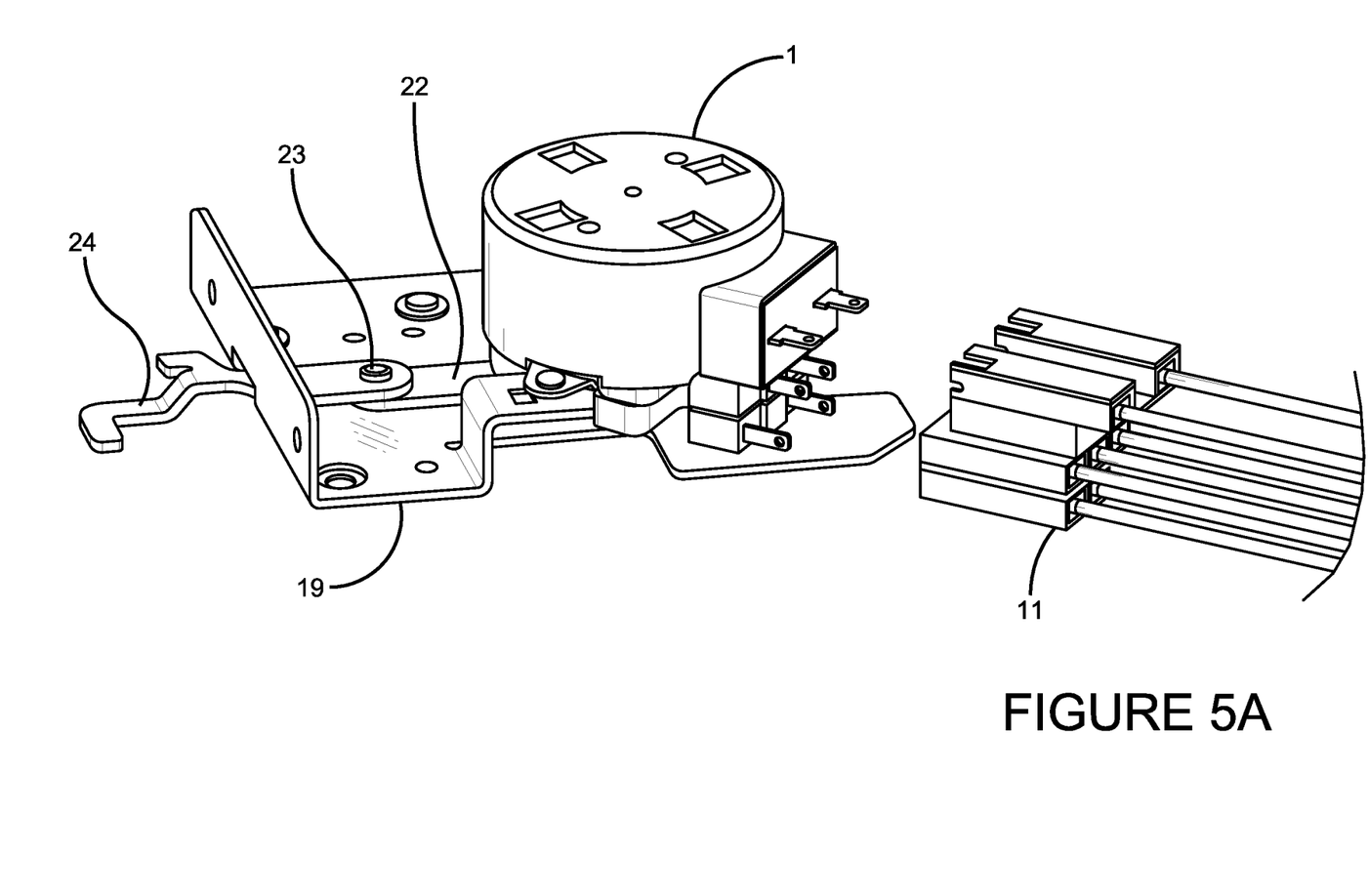
FIG. 5a is a perspective view of a further embodiment of an electric motor assembly and appliance wiring harness attached to a latching mechanism.
Figure 5B:
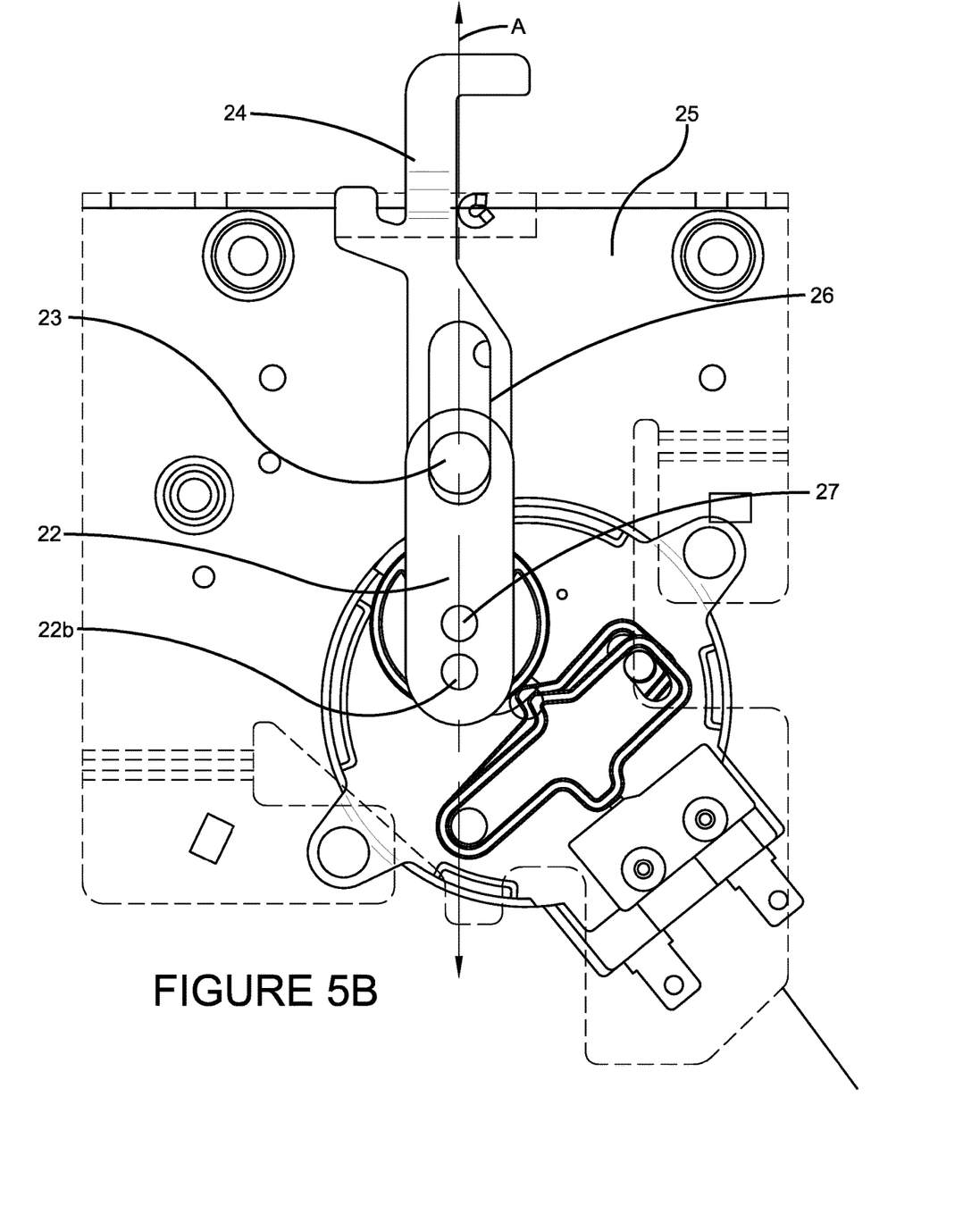
Figure 5C:
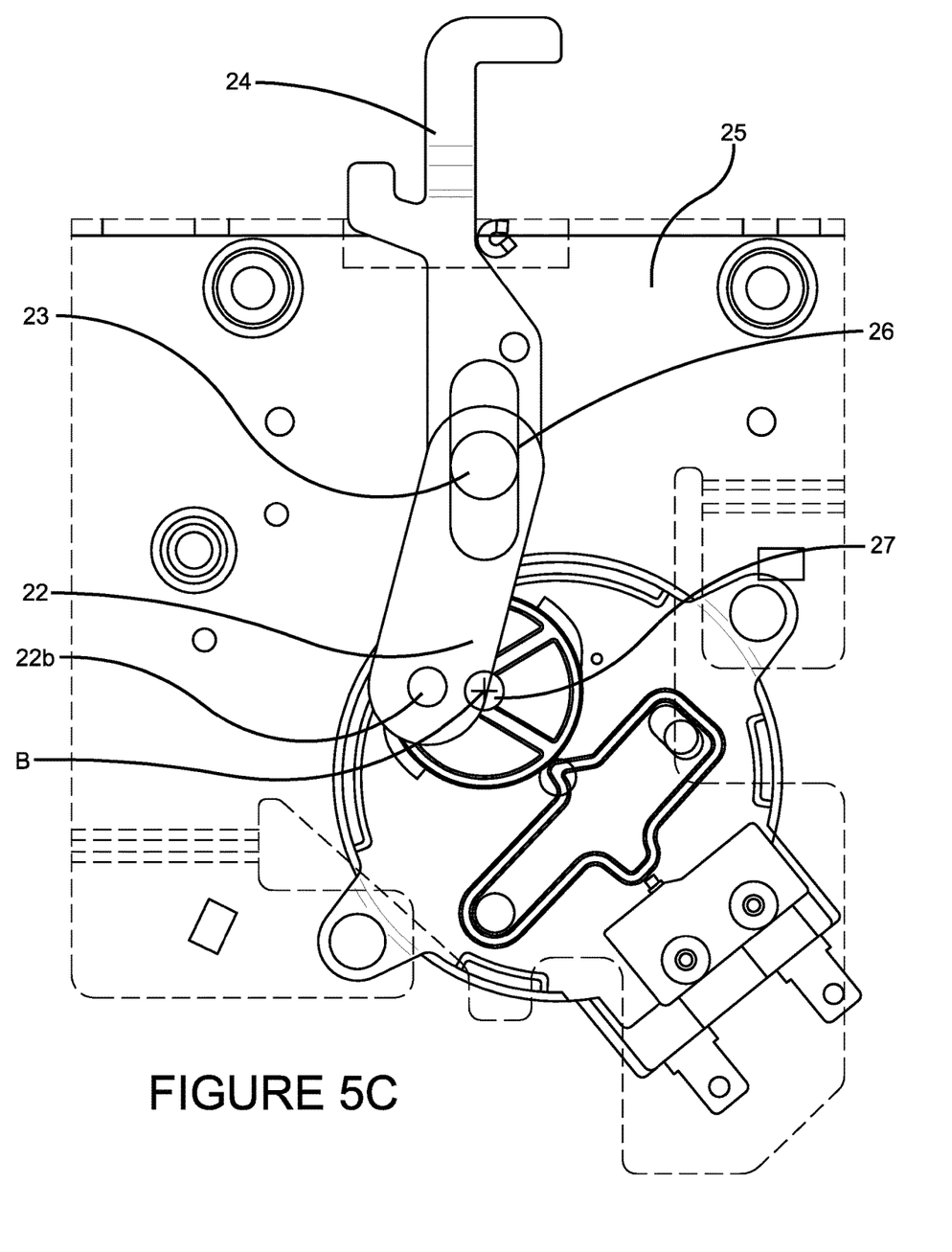
Figure 5D:
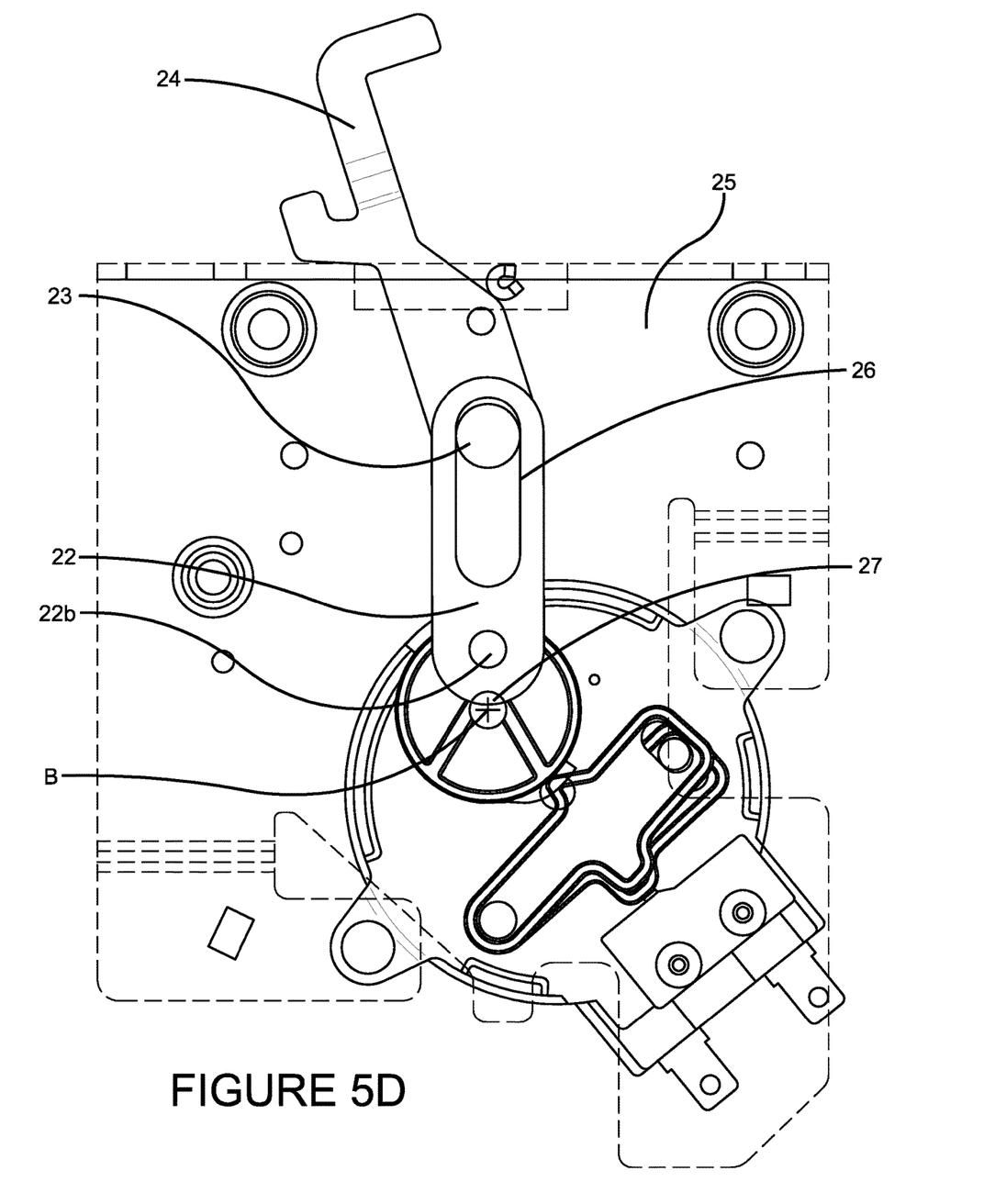
Figure 5E:
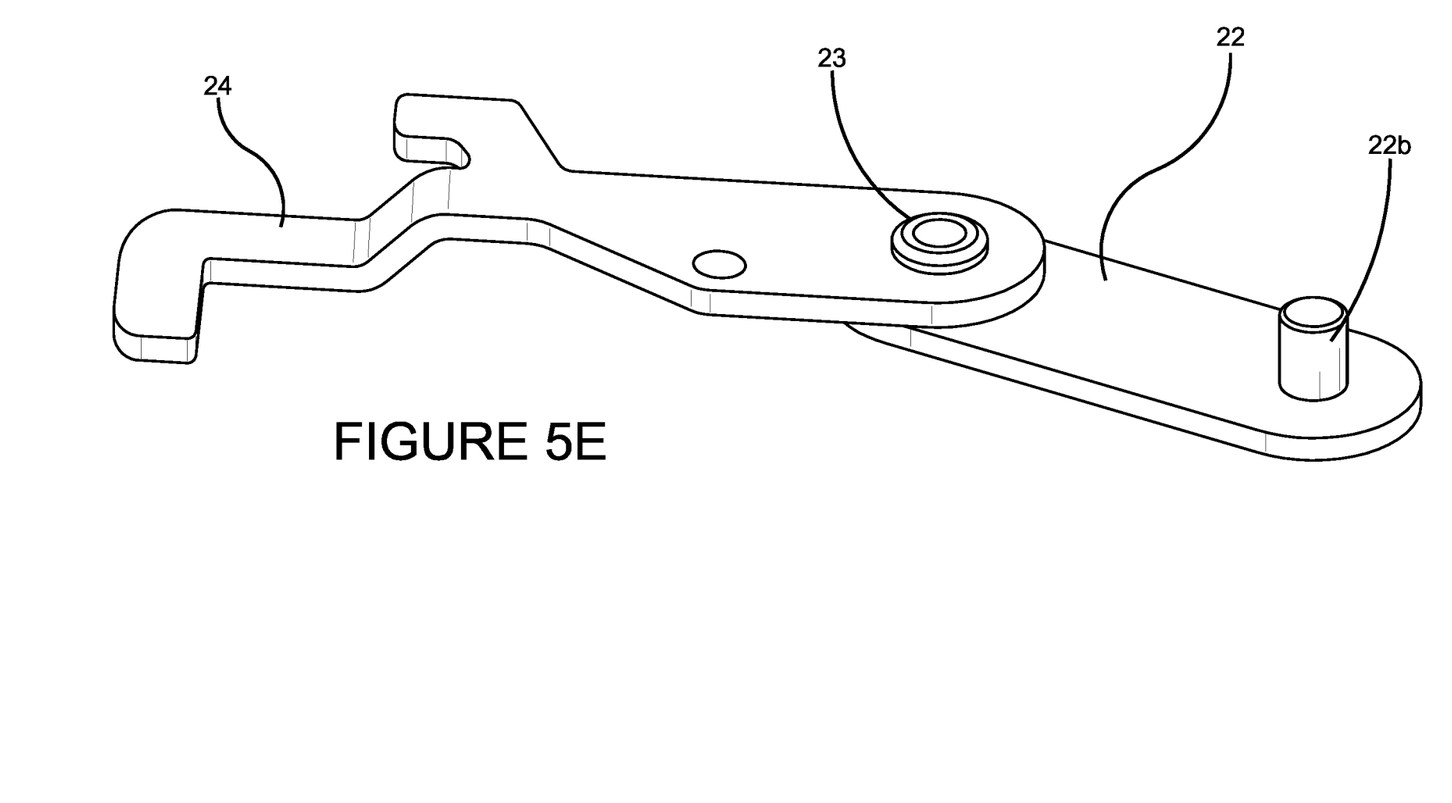
FIG. 5e is a perspective view of part of a mechanism.

FIGS. 3 and 4 illustrate a motor assembly similar in configuration to that shown in FIGS. 1 and 2 with the exception that a microswitch plunger switch (15) is positioned adjacent microswitch modules (6a) and (6b). In certain embodiments, the microswitch plunger switch (15) is electrically connected to the microswitches (6a) and (6b) allowing the microswitch plunger switch to be activated or deactivated upon activation or deactivation of microswitches (6a) and (6b) by the cam follower switch actuators (5a) and/or (5b). FIG. 4 illustrates a wiring harness (16) and corresponding electrical wires (18) having a single point power connector (17). The single point power connector includes an additional socket for connecting to the terminals of the microswitch plunger switch (15). As illustrated in FIGS. 1 and 2, the positioning of the microswitch plunger switch (15) adjacent to the microswitch modules (6a) and (6b) and the motor terminals (7) obviates the need for rigid or flexible circuit board and reduces dimensional tolerance stack up.

FIGS. 5a through 5e illustrate a motor assembly similar in configuration to that shown in FIGS. 1 and 2 which is attached to an oven latch mechanical assembly. The motorized oven latch (19) includes a lever (22) having a first end which is connected to an aperture within the radial cam (4) through a connecting link pivot pin (22b). The radial cam (4) is connected to the motor module (1) through a motor shaft (27) that protrudes through the baseplate (3). The motor shaft (27) defines a center axis B about which it is adapted to rotate. The motor module (1) rotates the radial cam (4) through the motor shaft (27). This allows the lever (22) to rotate in a clockwise or counter-clockwise manner along pivot pin (22b). The second end of the lever (22) is attached to a pivot axle (23) which connects the second end of the lever (22) to a latch hook (24). The pivot axle (23) is positioned within a guide slot (26) within a latch bracket (25). This allows the pivot axle (23) to travel linearly in a reciprocating manner within the guide slot (26) upon rotation of the radial cam (4). When operated, the motor module (1) rotates the radial cam (4) through the motor shaft (27) causing the lever (22) to rotate in a clockwise or counter-clockwise manner through the connecting link pivot pin (22b). This causes the second end of the lever housing the pivot axle (23) to extend or retract in a linear manner along an axis A within the guide slot (26) causing the latch hook to rotate in either a clockwise or counter-clockwise manner between a closed (i.e., locked) or open (i.e., unlocked) configuration for engaging or disengaging an appliance door. In one aspect of the present teaching, when the latch hook is in an engaged position, the radial cam (4) contacts the first contact point on the cam follower switch actuator (5a) and/or (5b) causing the cam follower switch actuator (5a) and/or (5b) to rotate so that the second contact point on the cam follower switch actuator (5a) and (5b) contacts a switch on a microswitch module (6a) and/or (6b). Upon activation of the microswitch module (6a) and/or (6b), a signal is sent to a controller (not shown), by opening or closing a circuit, to proceed with an appliance function. Appliance functions which may be controlled in such manner include but are not limited to normal operation of the appliance and self-cleaning operations of the appliance. As shown in FIG. 5, operation of the oven latch mechanism with the motor assembly is achieved without the use of a rigid or flexible circuit board. This eliminates a number of solder connections and significantly reduces the number of failure mode possibilities. The configuration also reduces the amount of dimensional tolerance stack-up as the radial and angular positioning of the switches with respect to the cam on the base plate eliminates the need to use additional mechanisms which require that the switches be affixed to adjacent brackets. The assembly shown in FIG. 5 also provides for a single point power connection as the motor terminals and microswitch terminals are positioned adjacent to one another.

Figure 6:
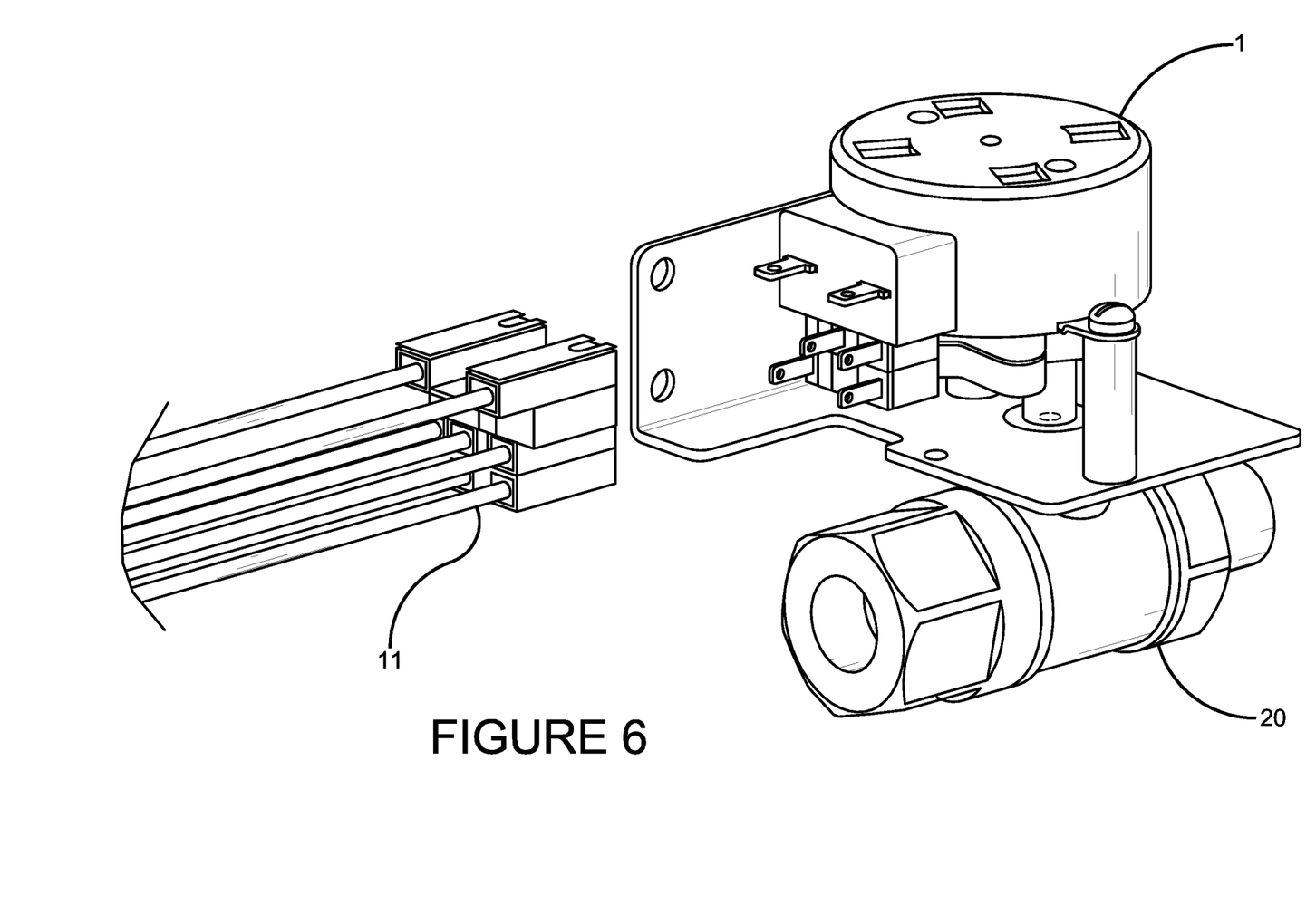
FIG. 6 is a perspective view of a further embodiment of an electric motor assembly and appliance wiring harness attached to a gas valve.

FIG. 6 illustrates a motor assembly similar in configuration to that shown in FIGS. 1 and 2 which is attached to a gas valve. The motorized gas valve (20) is attached to the motor assembly through an output shaft that extends from the motor module (1), through the radial cam (4) and which protrudes through the baseplate (3) to connect to and engage the valve within the motorized gas valve (20). In one aspect of the present teaching, the hub of the radial cam (4) through which the output shaft extends through may be centered within the radial cam (4). This allows the output shaft to rotate in a clockwise or counter-clockwise manner to open or close the valve within the motorized gas valve. In one aspect of the present teaching, when the valve is in an open configuration, the radial cam (4) contacts the first contact point on the cam follower switch actuator (5a) and/or (5b) causing the cam follower switch actuator (5a) and/or (5b) to rotate so that the second contact point on the cam follower switch actuator (5a) and (5b) contacts a switch on a microswitch module (6a) and/or (6b). Upon activation of the microswitch module (6a) and/or (6b), a signal is sent to a controller (not shown), by opening or closing a circuit, to proceed with an appliance function (e.g., operation of a gas-powered appliance). As shown in FIG. 6, operation of the gas valve mechanism with the motor assembly is achieved without the use of a rigid or flexible circuit board. This eliminates a number of solder connections and significantly reduces the number of failure mode possibilities. The configuration also reduces the amount of dimensional tolerance stack-up as the radial and angular positioning of the switches with respect to the cams on the base plate eliminates the need to affix the switches on adjacent brackets which requires the use of additional mechanisms which increase tolerance stack-up. The assembly shown in FIG. 6 also provides for a single point power connection as the motor terminals and microswitch terminals are positioned adjacent to one another.

Figure 7:
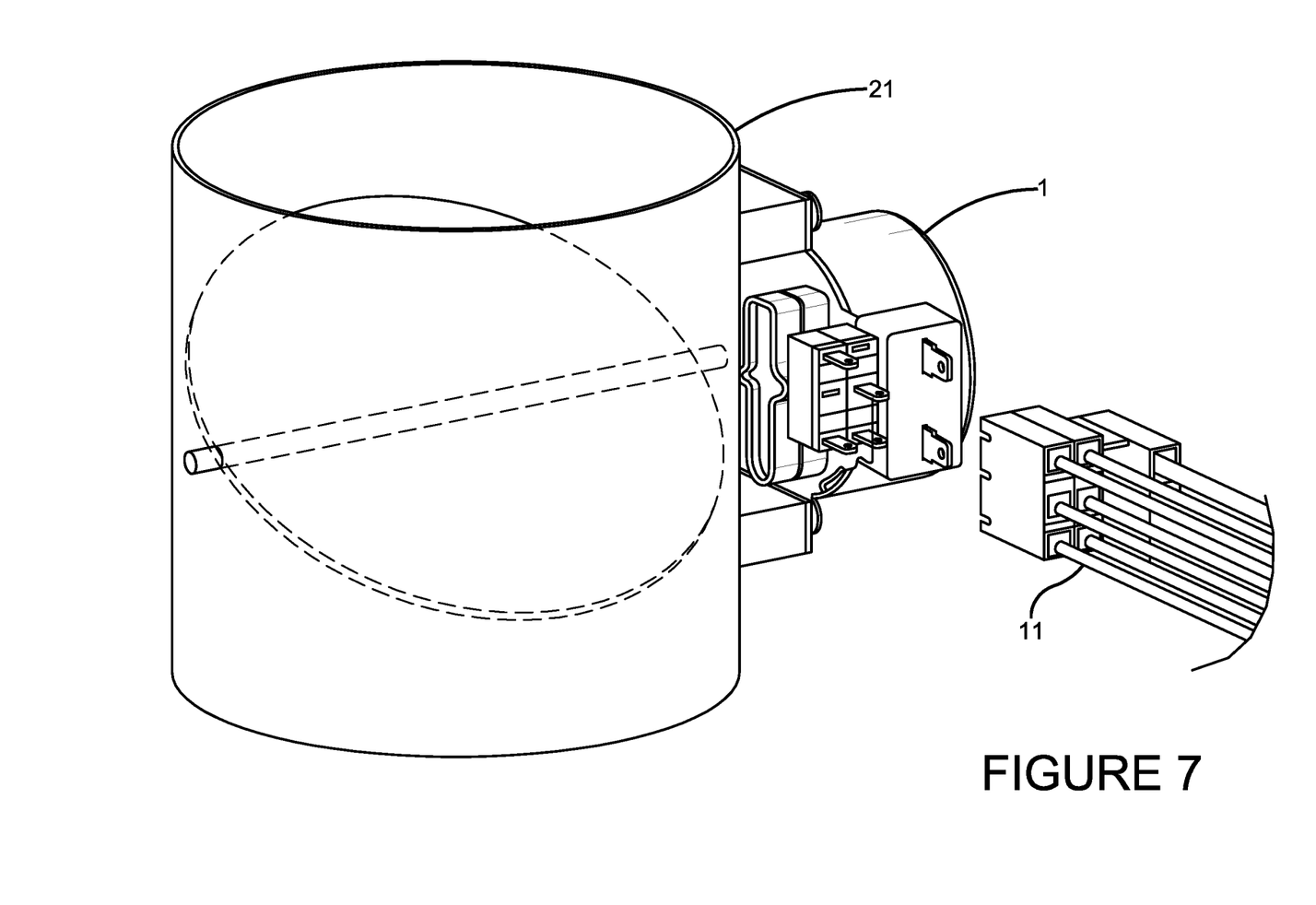
FIG. 7 is a perspective view of a further embodiment of an electric motor assembly and appliance wiring harness attached to a flue damper.

FIG. 7 illustrates a motor assembly similar in configuration to that shown in FIGS. 1 and 2 which is attached to a flue damper. The motorized flue damper (21) operates in a similar fashion to that of the motorized gas valve (20) illustrated within FIG. 6. The motorized flue damper (20) is attached to the motor assembly through an output shaft that extends from the motor module (1), through the radial cam (4) and which protrudes through the baseplate (3) to connect to and engage the flue damper. In one aspect of the present teaching, the hub of the radial cam (4) through which the output shaft extends through may be centered within the radial cam (4). This allows the output shaft to rotate in a clockwise or counter-clockwise manner to open or close the flue damper. In one aspect of the present teaching, when the flue damper is in an open configuration, the radial cam (4) contacts the first contact point on the cam follower switch actuator (5a) and/or (5b) causing the cam follower switch actuator (5a) and/or (5b) to rotate so that the second contact point on the cam follower switch actuator (5a) and (5b) contacts a switch on a microswitch module (6a) and/or (6b). Upon activation of the microswitch module (6a) and/or (6b), a signal is sent to a controller (not shown), by opening or closing a circuit, to proceed with an appliance function. As shown in FIG. 7, operation of the motorized flue damper (21) with the motor assembly is achieved without the use of a rigid or flexible circuit board. This eliminates a number of solder connections and significantly reduces the number of failure mode possibilities. The configuration also reduces the tolerance stack-up as the radial and angular positioning of the switches with respect to the cams on the base plate eliminates the need to affix the switches on adjacent brackets which requires the use of additional mechanisms which increase tolerance stack-up. The assembly shown in FIG. 7 also provides for a single point power connection as the motor terminals and microswitch terminals are positioned adjacent to one another.

Provided below is a table which lists the reference numbers and corresponding component description within each of the embodiments described within FIGS. 1 through 7.

FIG. 1
1—Synchronous Motor Module
2—Motor Housing Shell
3—Motor Housing Baseplate
4—Radial Cam
5a—Cam Follower/Switch Actuator
5b—Cam Follower/Switch Actuator
6a—Micro-switch
6b—Micro-switch
7—Motor Terminals
8—Switch Terminals
9—Follower Pivot Pin
10—Follower Guide Pin FIG. 2
1—Synchronous Motor Module
2—Motor Housing Shell
3—Motor Housing Baseplate
5a—Cam Follower/Switch Actuator
5b—Cam Follower/Switch Actuator
6a—Micro-switch
6b—Micro-switch
7—Motor Terminals
8—Switch Terminals
11—Appliance Wiring Harness
12—Single Point Connector
13—Wires FIG. 3
1—Synchronous Motor Module
2—Motor Housing Shell
3—Motor Housing Baseplate
4—Radial Cam
5a—Cam Follower/Switch Actuator
5b—Cam Follower/Switch Actuator
6a—Micro-switch
6b—Micro-switch
7—Motor Terminals
8—Switch Terminals
9—Follower Pivot Pin
10—Follower Guide Pin
15—Micro-switch
16—Switch Terminals FIG. 4
1—Synchronous Motor Module
2—Motor Housing Shell
3—Motor Housing Baseplate
3b—Motor Housing Baseplate Extension
5a—Cam Follower/Switch Actuator
5b—Cam Follower/Switch Actuator
6a—Micro-switch
6b—Micro-switch
7—Motor Terminals
8—Switch Terminals
14—Micro-switch (Plunger Switch)
15—Switch Terminals (Plunger Switch)
16—Appliance Wiring Harness
17—Single Point Connector with Plunger Switch Connection
18—Wires FIGS. 5a through 5e
1—Synchronous Motor Module
11—Appliance Wiring Harness
19—Motorized Oven Latch
22—Lever
22b—Connecting Link Pivot Pin
23—Pivot Axle
24—Latch Hook
25—Latch Bracket 26—Guide Slot in Latch Bracket
27—Motor Shaft
FIG. 6
1—Synchronous Motor Module
11—Appliance Wiring Harness
20—Motorized Gas Valve
FIG. 7
1—Synchronous Motor Module
11—Appliance Wiring Harness
21—Motorized Flue Damper While the electro-mechanical assemblies provided herein have been described in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the electromechanical assembly should not be limited to any single embodiment, but rather construed in breadth and scope in accordance with the recitations of the appended claims.

What is claimed is:

1. An electric motor assembly comprising:
    a motor module housed within a motor housing shell having a front cover, a cylindrical side wall and an open back side;
    a motor housing baseplate attached to the open back side of the motor housing shell; a motor shaft which extends through the motor housing baseplate and which engages a cam;
    at least one microswitch module which is positioned adjacent to the cam, wherein the cam engages the at least one microswitch module at a contact point upon rotation of the cam by the motor;
    microswitch terminals which extend from the at least one microswitch module;
    motor terminals which extend from the motor module through the motor housing shell;
    wherein the microswitch terminals are positioned adjacent to the motor terminals to provide a single power point connection for connecting sockets of a wiring harness.

2. The electric motor assembly of claim 1, wherein the cam engaged by the motor shaft, is a radial cam.

3. The electric motor assembly of claim 2, wherein the radial cam engages at least one cam follower switch actuator.

4. The electric motor assembly of claim 3, wherein the cam follower switch actuator comprises a first projection, wherein the first projection establishes a first contact point between the cam follower switch actuator and the radial cam.

5. The electric motor assembly of claim 4, wherein the cam follower switch actuator comprises a second projection, wherein the second projection establishes a second contact point between the cam follower switch actuator and the at least one microswitch module.

6. The electric motor assembly of claim 5, wherein the cam follower switch actuator comprises a first aperture at a first end and a slot at a second end, wherein the first aperture receives a pivot pin and the slot receives a guide pin, wherein the pivot pin and the guide pin allow the cam follower switch actuator to rotate upon contact of the first projection with the radial cam causing the second projection to contact the at least one microswitch module.

7. The electric motor assembly of claim 6, wherein the motor housing baseplate includes at least one extension including an aperture therein for receiving a fastener.

8. The electric motor assembly of claim 7, further comprising a plunger microswitch and plunger microswitch terminals positioned adjacent to the at least one microswitch module and the motor terminals.

9. The electric motor assembly of claim 8, wherein the plunger terminals, the microswitch terminals and the motor terminals form a single power point connection with sockets of a wiring harness.

10. The electric motor assembly of claim 1, wherein the electric motor assembly does not comprise a rigid or flexible circuit board to electrically connect switches to the motor module.

11. The electric motor assembly of claim 1, wherein the electric motor assembly does not comprise a secondary cam or plunger on a bracket separate from the motor housing baseplate.

12. The electric motor assembly of claim 11, wherein radial and angular positioning of the at least one microswitch module with respect to the cam on the motor housing baseplate reduces tolerance stack up of the cam and the at least one microswitch module compared to electric motor assemblies having a secondary cam or plunger on a bracket separate from the motor housing baseplate.

13. The electric motor assembly of claim 1, wherein the electric motor assembly is connected to a mechanical assembly for an appliance.

14. The electric motor assembly of claim 13, wherein the electric motor assembly is connected to a motorized oven latch.

15. The electric motor assembly of claim 13, wherein the electric motor assembly is connected to a motorized gas valve.

16. The electric motor assembly of claim 13, wherein the electric motor assembly is connected to a motorized flue damper.

17. A method for installing an electric motor assembly within an appliance comprising:
    1) providing an appliance;
    2) providing an electric motor assembly comprising:
        a motor module housed within a motor housing shell having a front cover, a cylindrical side wall and an open back side;
        a motor housing baseplate attached to the open back side of the motor housing shell;
        a motor shaft which extends through the motor housing baseplate and which engages a cam;
        at least one microswitch module which is positioned adjacent to the cam, wherein the cam engages the at least one microswitch module at a contact point upon rotation of the cam by the motor module;
        microswitch terminals which extend from the at least one microswitch module; and
        motor terminals which extend from the motor module through the motor housing shell;
        wherein the microswitch terminals are positioned adjacent to the motor terminals to provide a single power point connection for connecting sockets of a wiring harness;
    3) providing a mechanical device in operable association with the electric motor assembly, wherein the mechanical device and the electric motor assembly are housed on a chassis;

4) inserting the chassis containing component parts of the mechanical device and the electrical motor assembly within the appliance;
5) connecting the mechanical device to the appliance by connecting the chassis to the appliance and the component parts of the mechanical device to the appliance; and
6) electrically connecting the electric motor assembly to the appliance by connecting sockets of an appliance wiring harness to switch terminals and motor terminals within a microswitch-electric motor connector port through a single point power connection.

18. The method of claim 17, wherein the mechanical device is one of an oven latch, a gas valve and a flue damper.

19. An electric motor assembly comprising:
a synchronous gear motor housed within a motor housing shell having a front cover, a side wall and an open back side;
a motor housing baseplate attached to the open back side of the motor housing shell;
a motor shaft defining a center axis B of the motor shaft about which it is adapted to rotate, the motor shaft, operationally engaged to the synchronous gear motor, adapted to output work therefrom, and which extends through the motor housing baseplate;
a first cam located on and operationally engaged with the motor shaft;
a first microswitch module selectably closable by rotation of the first cam;
microswitch terminals which extend from the first microswitch module;
motor terminals which extend from the synchronous gear motor through the motor housing shell;
wherein the microswitch terminals are positioned adjacent to the motor terminals to provide a single power point connection adapted for operational engagement with an associated wiring harness socket.

20. The electric motor assembly of claim 19,
wherein the electric motor assembly further comprises
a first cam follower between the first cam and the first microswitch module,
a second cam located on and operationally engaged with the motor shaft,
a second microswitch module selectably closable by rotation of the second cam, and
a second cam follower between the second cam and the second microswitch module; and
wherein
the first cam follower is adapted to be rotated into contact with and close the first microswitch module in response to rotation of the first cam into a first orientation,
the second cam follower is adapted to be rotated into contact with and close the second microswitch module in response to rotation of the second cam into a second orientation, and the second orientation is 180 degrees from the first orientation;
wherein electric motor assembly further comprises a latch mechanical assembly having
a connecting link pivot pin engaged with the first cam, parallel with and offset from the motor shaft and adapted to rotate about the motor shaft with the first cam,
an elongated connecting link having,
a first end located on and rotatably engaged with the connecting link pivot pin, and
a second end opposite the first end and having a pivot axle engaged therewith,
the pivot axle being adapted to linearly reciprocate along an axis A as the connecting link pivot pin rotates about the motor shaft, and wherein the axis A intersects the center axis B of the motor shaft.

* * * * *